United States Patent [19]

Hansen

[11] E Re. 29,025

[45] Reissued Nov. 2, 1976

[54] METHOD AND APPARATUS FOR DETERMINING ELEVATION

[75] Inventor: Howard C. Hansen, Battle Creek, Mich.

[73] Assignee: Clark Equipment Company, Buchanan, Mich.

[22] Filed: Dec. 18, 1975

[21] Appl. No.: 642,033

Related U.S. Patent Documents

Reissue of:

[64] Patent No.: 3,854,820
Issued: Dec. 17, 1974
Appl. No.: 441,683
Filed: Feb. 11, 1974

U.S. Applications:

[63] Continuation of Ser. No. 288,607, Sept. 13, 1972, which is a continuation-in-part of Ser. No. 84,708, Oct. 28, 1970, abandoned.

[52] U.S. Cl. ..... 356/138; 214/16.4 A; 356/140; 356/153; 356/172; 356/247

[51] Int. Cl.[2] ..... G01B 11/26; G01B 11/27; G01C 9/00

[58] Field of Search ..... 356/138, 140–141, 356/147, 150–151, 153, 172, 247–248; 250/215, 222; 214/16.4 A; 116/28 R; 240/7.1 C, 7.1 G

[56] References Cited

UNITED STATES PATENTS

| | | | |
|---|---|---|---|
| 2,804,218 | 8/1957 | Sylvester et al. | 214/16.4 A |
| 2,916,836 | 12/1959 | Stewart et al. | 250/215 |
| 3,149,196 | 9/1964 | Roth | 356/138 |
| 3,242,340 | 3/1966 | Layne | 356/247 |
| 3,471,234 | 10/1969 | Studebaker | 356/138 |
| 3,656,828 | 4/1972 | Scholdstrom | 356/138 X |
| 3,672,470 | 6/1972 | Ohntrup et al. | 250/222 |
| 3,742,581 | 7/1973 | Roodvoeis | 356/153 X |

FOREIGN PATENTS OR APPLICATIONS

| | | |
|---|---|---|
| 774,460 | 2/1972 | Belgium |

*Primary Examiner*—John K. Corbin
*Assistant Examiner*—Wm. H. Punter
*Attorney, Agent, or Firm*—John C. Wiessler

[57] ABSTRACT

A light reference system for generating [ a collimated beam of light and converting ] and projecting [ the same as ] a relatively intense fan-shaped or diverging plane of light from an operator manipulatable device on a machine or a vehicle to an object or opening which may be positionally referenced to the device in a selected predetermined relation by operator control of the machine or vehicle and manipulatable device, thus enabling the operator to observably locate a sharply defined resulting line of light so as to establish such selected relation. The light reference system is capable of a number of different embodiments or forms, a few of which are disclosed herein. An exemplary embodiment of the machine or vehicle with which such a system is combined herein is of a fork lift truck vehicle on which the light reference system in various forms is mounted on the elevatable load handling device or fork carrier for generating [ a collimated beam of light and for converting the same into ] a flat plane of diverging light, referred to [ usually ] *sometimes* herein as a "fan-shape" of light, having abrupt demarcation in intensity and projected as a relatively intense operator observable line of light to any selected object, such as to a pallet in an elevated bin of a storage rack, in a predetermined attitude with respect to the load handling device such as the fork of a fork truck. Also disclosed is an embodiment which projects an image or visual reference in the form of a line of light, generated by a scanning laser beam, and projected on surfaces in the path of the projected light such as a pallet as recited above.

38 Claims, 11 Drawing Figures

METHOD AND APPARATUS FOR DETERMINING ELEVATION

Matter enclosed in heavy brackets [ ] appears in the original patent but forms no part of this reissue specification; matter printed in italics indicates the additions made by reissue.

This is a continuation of application Ser. No. 288,607, filed Sept. 13, 1972, which is in turn a continuation-in-part of application Ser. No. 84,708, filed Oct. 28, 1970, now abandoned.

BACKGROUND OF THE INVENTION

The field of art to which the invention pertains includes vehicle and machine positional reference devices, and more particularly light reference systems for operator positioning of vehicles and machines.

It has long been a problem in the art to which this invention pertains for operators of various types of load handling vehicles to be able to efficiently spot a load or vehicle load handling device in some predetermined relationship to an object or opening. Operation of such vehicle load handling devices as are contemplated requires the operator of the vehicle and device to accurately locate the device variously in three dimensions, thereby requiring heretofore substantial operator skill and good visual perspective. Vehicles of types such as can benefit from the present invention include, for example, fork lift trucks, indoor and outdoor cranes, mining equipment, sling and boom type machines such as in shipboard handling and dock side operations, and basicaly any other type of vehicle which requires operator skill in accurately positioning and manipulating in three dimensions a device associated with the vehicle. The problem is well exemplified by a fork lift truck in operation, and the pesent invention is disclosed in a fork truck environment, although it will be appreciated that the environment is exemplary only, the principal being generally applicable in certain vehicular and machine arts, as above noted.

Referring now to exemplary fork truck operations in general in relationship to the driver's problem, it will be readily appreciated that it is frequently difficult for the driver to accurately judge the height and precise location of his fork in relation to an object or opening, particularly in relation to, for example, high rise warehouse rack installations for article storage. The problem of judging height, distance and location as required to insert the fork in the fork openings of a pallet at high elevation, for example, may be difficult even for skilled operators. Also, when the fork is within a few feet of the driver's eye elevation, on some trucks it is difficult for him to see through both the upright or lift frame and the fork carriage to observe the tips of the fork, although such observation is critical in order to properly locate the fork in relation to an article to be engaged. As a result, there is frequent damage to pallets, storage racks and merchandise.

Another serious problem associated with normal fork truck operation heretofore is that the driver tends to slow the truck to an extremely low creep speed, or even stops it altogether, to adjust or correct the fork elevation and location just prior to inserting the fork into a pallet, or prior to inserting a load into a rack opening, for example. A serious reduction in potential fork truck productivity results.

Recently there has been a considerable amount of development work done to attempt to solve this problem, much of which has been directed to systems and devices for automatically positioning the fork in elevation without driver control other than the selection, as by push buttons, of a particular bin height in a storage rack, for example, at which an article is to be engaged or deposited. Such systems and devices are relatively costly both in price and in cost of installation and maintenance.

In addition, automatic fork height systems which reference from the truck cannot compensate for floor and rack shelf elevation variations. The height of every shelf may be introduced into the memory of the automatic system, whereas my fork light system can be used instantly for any shelf height, in boxcars, semi-trailers, and wherever material handling operations require precise referencing to a location of pick-up or deposit or transfer. My invention utilizes the operator in the system to provide a total flexibility in operation. The fork light can effectively compensate for any variations in floor and shelf elevation, for example, since the operator makes whatever visible adjustments are necessary to provide the correct and precise final adjustment. Inasmuch as the reference light shines both to the left and right, as well as ahead, it also provides an excellent reference means for leveling the fork of lift trucks, for example, prior to pallet entry. Automated systems either have no reference means for leveling the fork or the mast must be brought from a load carrying back tilt position to a vertical position by automatic means, at additional cost and complexity. An example of one such automatic fork height and tilt positioner is disclosed in U.S. Pat. No. 3,319,816, common assignee. Automatic fork height positioners have not been generally accepted to date in the industry, and so the above problem remains without an adequate solution.

[ In addition, prior art of some general background pertinence appear in U.S. Pat. No. 3,502,232 relating to a load size and position detector for automatic storage apparatus, a non-coherent light spot projector as suggested in FIG. 3 of U.S. Pat. No. 2,804,218 which relates to a load transfer means for lift trucks, and a photoelectric position control for the load carriage of a fork truck as disclosed in U.S. Pat. No. 3,672,470. None of these patents disclose or suggest the instant invention as already characterized in the above Abstract.]

SUMMARY

My invention is of particular value in improving a vehicle or machine operator's basis of judgment, particularly in respect of minimizing the need for judgment based on depth perception in locating a vehicular load handling device in relation to any selected object or opening. I have found that by providing a light reference system which is capable of [ collimating light and then ] projecting [ it as a fan-shaped ] *light collimated in at least one dimension and traversing a diverging* plane *which is reflected as a relatively intense line of light* in a predetermined direction and relation or attitude to a vehicular load handling device, for example, that the latter device can be quickly located by the operator in a precise selected relation to any object or opening foreign to the vehicle. The resulting sharply demarcated intense line of light which is reflected affords the operator a visual perception of the precise location of the load handling device not otherwise available.

It is therefore a primary object of the invention to provide an essentially simple and efficient means at relatively low cost of aiding a machine or vehicle operator in manipulating an associated work device to be selectively and precisely located in relation to an object or opening by the use of a sharply defined reference line of reflected light or apparent line of reflected light.

Another important object of the invention is to provide in a vehicle or machine having a load handling device manipulatable both with the vehicle and independently thereof in elevation, a means for orienting the device in selected relation to an object or opening by operator observation and positional control of a projected reference line of reflected or apparent line of reflected light which is oriented in predetermined relation or attitude to the load handling device.

Another object of the invention is to provide a light reference system of the type contemplated for industrial lift trucks wherein the major components of the system are mounted in a compact and protected section of the lift carriage.

A number of other objects, features, and advantages of the invention will appear as the description proceeds.

DESCRIPTION OF PREFERRED EMBODIMENTS

Figure 1:
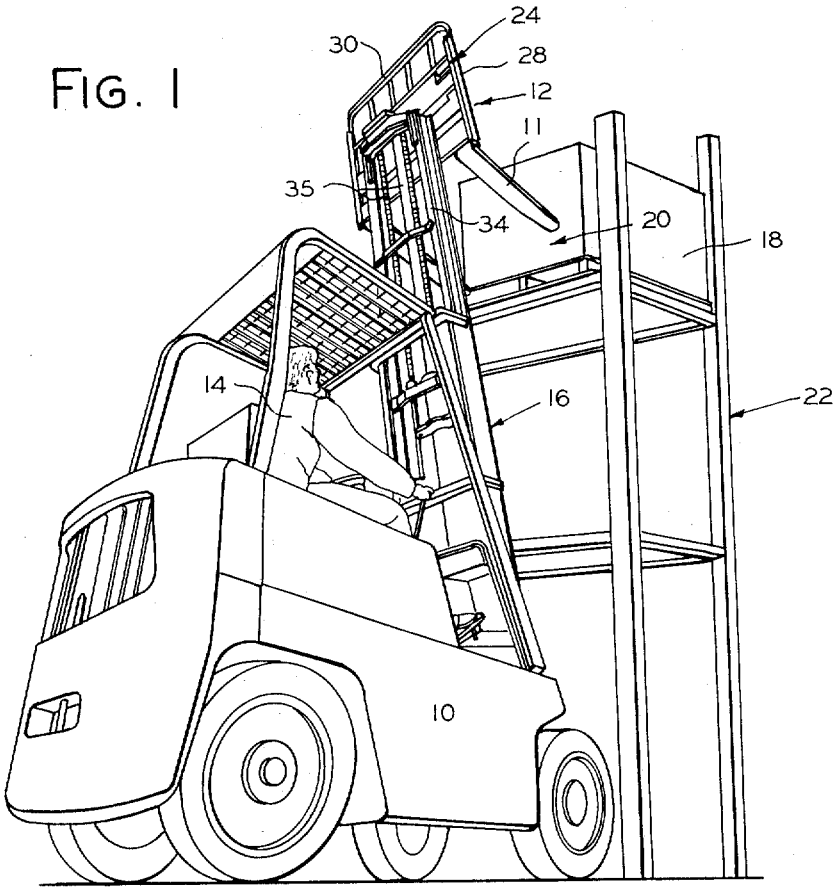
FIG. 1 is a perspective view of a fork truck utilizing the invention which shows the mast in an elevated position and in predetermined relation to a loaded pallet ready to be engaged in the bin of a storage rack structure.
Figure 2:
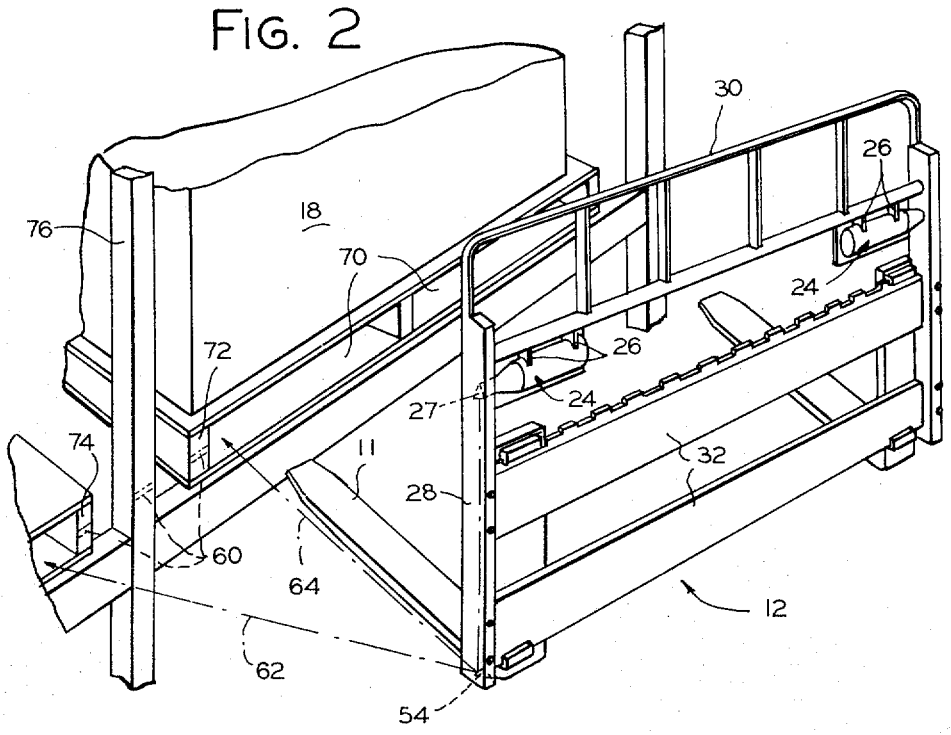
FIG. 2 is a somewhat schematized view of the elevated fork carriage portion of FIG. 1 preparatory to entering the pallet in the rack of FIG. 1.

Referring first to FIGS. 1 and 2, a fork truck of known design is illustrated generally at numeral 10 in a position wherein the fork 11 and fork carriage assembly 12 is elevated and is being located by a truck operator 14 by means of both manipulation of the truck drive controls and of the hydraulic controls of a mast assembly 16 in preparation to engage a pallet and load 18 in a bin 20 of a storage rack structure 22. A collimated light beam generating assembly 24 is supported from each side portion of the fork carriage assembly by means of a pair of brackets 26. Preferably each assembly 24 is located so that a reduced diameter end tubular portion 27 is inserted in an opening in a hollow structural vertical fork carriage member 28 which forms a portion of a load backrest 30 located on a pair of vertically spaced fork bars 32 which in turn are supported by fork carriage brackets, not shown, roller mounted in an inner telescope I-beam section 34 of the upright in well-known manner. A conventional hydraulic lift cylinder and reeved chain assembly 35 is controlled by the operator to raise and lower the fork and carriage assembly 11, 12 and the mast section 34 to selected heights between ground level and maximum fork height for engagement, transport and deposit of loads, as is well-known.

Figure 3:
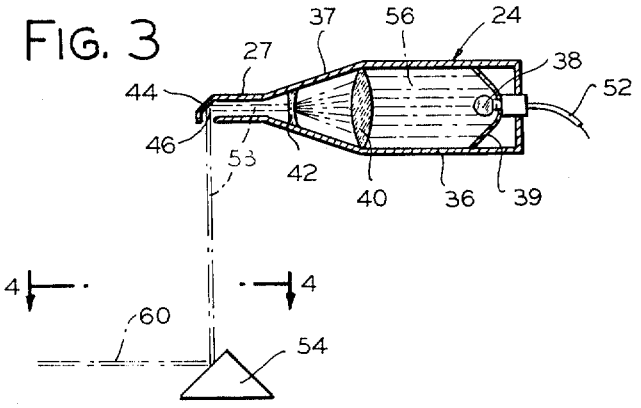
FIG. 3 is a partial sectional view which illustrates an exemplary light beam projection device for use on a fork carriage such as shown in FIG. 2.
Figure 7:
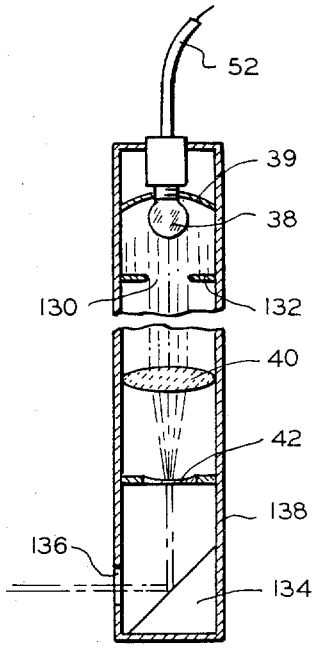
FIG. 7 is a schematic representation of a modified system which may be incorporated in a box-beam structure generally similar to that shown in FIG. 6 for generating and projecting a fan of light.

FIG. 3 depicts schematically a light and optical system suitable for use in the above exemplary embodiment in which an electric torch casing is shown having a tubular portion 36 of relatively large diameter, a small diameter tubular end portion 27, and a tapered central section 37 connecting the two portions. The casing embodies parabolic reflector 39, a high intensity light source 38 capable of generating a relatively wide beam of light 56, a first lens 40, a second lens 42, a reflecting mirror 44, an opening 46 having an axis transverse to the axis of the housing assembly, and a lead 52 connecting the light source 38 to a power supply which is in turn connected to an accessory truck battery. A conical reflector 54 is provided in predetermined vertically spaced relation to light and optical device 24 and in predetermined spaced axial relation to opening 46. Light source 38, as shown, is an incandescent lamp connected to input D.C. power from the battery of the truck. An actual design installation for such a system may be preferably as shown in FIG. 7, to be described in detail below.

As is well-known in respect of parabolic reflectors, light from source 38, which should be located at the exact focal point of the reflector 39, is reflected in a plurality of parallel light lines 56 which are caused to converge by lens 40 along housing portion 37 to the concave side of straightening lens 42 which collimates and intensifies the light into a high intensity narrow pencil beam 58 in housing portion 27. In this embodiment it is convenient to mount the light and optical system in relation to the fork and carriage assembly as described above, so that reflecting mirror 44 is mounted in the end of housing portion 27 at 45° to both the axes of opening 46 and the portion 27, thereby turning the collimated beam 58 to be directed axially of opening 46.

Figure 4:
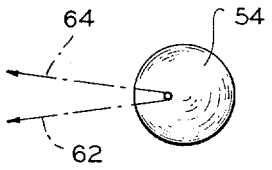
FIG. 4 is a view taken along line 4—4 of FIG. 3.

Light beam 58 may be focused as desired, such as at infinity or at some determined distance which may be preferred in certain applications. In the present embodiment it is preferred that the beam 58 be focused about one foot beyond the tips of the fork tines 11. The substantially right angle reflection by mirror 44 projects the pencil beam 58 onto a reflective surface of the right angle cone 54 such that the beam 58 approaches the conic surface parallel to the vertical axis of the cone. The pencil beam of light when reflected from the conic surface will, except for some slight dispersive effect, retain a constant cross-sectional dimension 60, i.e., it is collimated in one dimension, and, as shown in FIG. 4, the beam 58 also fans outwardly as represented by outer limit lines 62 and 64. The angle between lines 62 and 64 traversed by the light beam is determined by the cross-sectional diameter of the beam and by the distance it is displaced from the vertical axis which passes through the apex of cone 54. In practice only a small portion of the surface of the cone may be required.

The light optical system of my invention as embodied in FIG. 2 utilizes the structural members of the fork carriage, load backrest and fork tines to both support and protect elements of the system such that in no way is the operator of the truck limited in the manner in which the vehicle is used in practice. As shown, the angle of dispersion of the light beam is relatively small based upon the location at which it strikes cone 54 and the particular configuration and design of the light optical assembly 24. Factors such as the cross-sectional area of the light beam and the angle of dispersion thereof may, of course, be varied to suit requirements. The present embodiment inherently lends itself well to some of the particulars of the support of the system and the configuration shown in the right angle fork tine and carriage assembly; as used in lift truck type vehicles.

FIGS. 1 and 2 depict a situation in which a left turn is being executed for the purpose of inserting the fork tines 11 into the openings 70 of a double faced pallet of conventional construction shown in conjunction with a load at numeral 18. A sharply demarcated line of light from the fan shaped beam formed between limit lines 62 and 64 is reflected from the end edges of end stringers 72 and 74 of adjacent pallets, and from the intermediate post 76 of the rack 22. The intensity of the projected line of light is preferably sufficient to enable easy observance thereof in brightly lighted warehouses, and the like. This indicates to the driver from the relatively difficult vantage point of the operator's station, particularly during high lift deposit and pick-up operations, that if the truck mast 16 is vertical (a lift truck operator should always be aware of the angle of tilt, if any, of the upright) the fork which is in a horizontal position will be at the proper elevation for safe insertion into the pallet fork pockets 70, as will be explained in greater detail below in respect of FIG. 5. Similarly, the optical and light system on the right-hand side of the fork and carriage assembly operates to indicate to the driver the fork position for insertion into loaded pallets when executing a right turn into a storage rack area. Of course, the units work together to aid the driver in centering the fork assembly in respect of a loaded pallet or bin opening or any deposit or pick-up location, when operating straight ahead.

Figure 5:
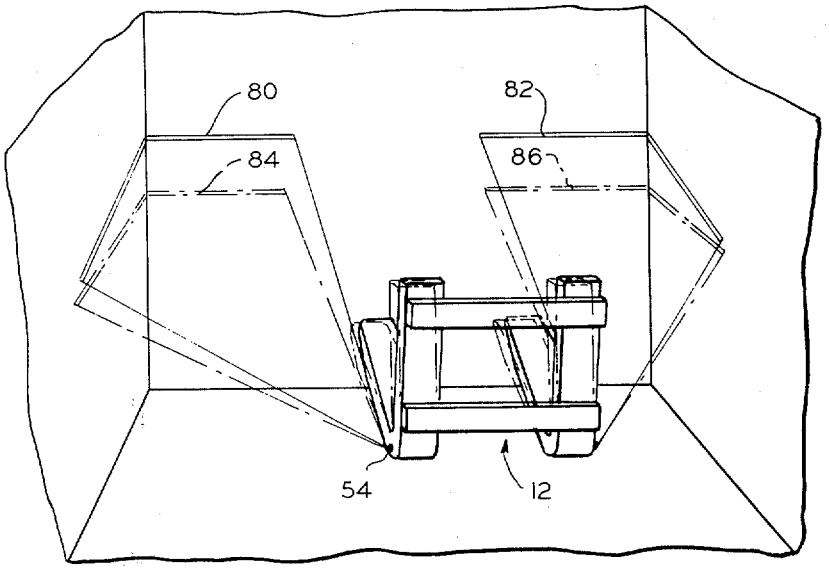
FIG. 5 is a diagrammatic illustration of level and tilted fork tines in a closed passageway projecting lines of light on end and sidewalls to illustrate certain principles of this invention.

In order to illustrate more graphically certain of the characteristics of the invention in use I show diagrammatically in FIG. 5 a "floating" fork carriage assembly 12 approaching the end of a closed passageway in which the side walls are, of course, parallel to each other and all intersecting walls and the floor are mutually perpendicular to each other. Two fork positions are illustrated. The solid line position represents a back tilt fork position which projects on the end and side walls of the passageway lines of light 80 and 82. The broken line position represents a horizontal position in which the truck mast is vertical, which is the required position for entering pallets, for example. In this position the fans of light generated project lines of light 84 and 86 on the end and side walls, all of said lines of light being located in the plane of the fork as previously described, and preferably in the planes of the upper surfaces of the fork tines for maximum reference effectiveness.

As will be discussed later herein connection with FIGS. 8 and 9 it is also feasible and preferred to use a single reference fan of light located, for example, on one side only of the fork carriage assembly which would produce a single wide angle fan of light extending in the example of FIG. 5 across the entire end wall and along the side walls as shown. Also, as will be discussed in respect of FIG. 10, a similar observable result is attainable by producing an apparent line of light through the utilization of, for example, a bottle type gas laser in conjunction with a motor driven angled mirror. However, all of the exemplary embodiments disclosed herein and other possible embodiments and optical systems not disclosed herein but within the scope of the invention, should all have the common characteristics in use as exemplified in FIG. 5 by the differences in location of the lines of light 80 and 84, and 82 and 86, in respect of being precisely referenced to fork elevation and attitude in the aisle.

The fan of light generated by my system may have fan angles in the FIG. 2 embodiment, as represented in FIG. 5, of from 30° to 60°, focused on infinity, and having a relatively small vertical cross sectional dimension, as about 0.75 inches, so that when the fan of light is directed ahead onto a wall the reflection will comprise concurrent narrow rays of light, the thickness of the reflected rays of light not varying appreciably whether the wall is very close or 8 to 10 feet away from the conical reflectors 54. The most precise reference in relation to fork truck operations is obtained if the rays of light at the lower extremity of the fan, which focus to form the bottom edge of the line of light, are concurrent or aligned with the plane defined by the upper surface of the adjacent fork tine.

Referring particularly now to lines of light 80 and 82, it should be understood that the back tilt of the fork carriage is equal to the angle between the sloping projection of the lines of light on the sidewalls and the horizontal projections thereof as lines 84 and 86. Furthermore, the elevation of lines 80 and 82 above lines 84 and 86 on the end wall comprise an effective measure of fork back tilt. Thus, the operator is able to readily observe at any elevation of the fork the precise attitude of the fork by the angle of the reflected lines of light on the racks which lines the sides of an aisle along which the truck is moving, for example. Viewing FIGS. 2 and 5 together, it will be observed that as the truck is manipulated to turn the fork carriage into a left side located pallet 70, the line of light 80 will be observed sloping on the rack and pallet load as in FIG. 5 if the fork is in the back tilt position of FIG. 5, and the operator immediately knows that he must adjust the fork until the sloping line of light becomes horizontal as line 84. Forward tilting of the fork has an opposite effect, of course, in that the slope of the line of light will be opposite to that of line 80 and effect a line on the end wall which is below line 84 a distance which is proportional to the forward fork tilt. Thus, it will be apparent that required operator skill in three dimensional perception and maneuvering of the truck will be minimized in the use of the invention, with a consequent increase in productivity and efficiency, and minimal damage to loads and pallets because of misjudgments on the part of the operator.

Any suitable means of providing the light source may be employed, such as the incandescent lamp described above and to be described below in connection with a modification thereof shown in FIG. 7, arc lights, particularly with Xenon short arc lamp, described below in connection with the modifications shown in FIGS. 6, 8 and 9, a gas laser preferably of the bottle type as described below in the modification shown in FIG. 10, or any other suitable light source which may be found. The light source may be pulsed or it may burn steadily or it may produce a scanning effect to produce an image of a line of light, as in the laser beam embodiment in FIG. 10 hereof. [The primary requisites are that the light be in the visible spectrum, be substantially collimated and of relatively high intensity, and that it be processed in focus by an appropriate reflecting optical surfaces, apertures and/or lenses to form a fan of light or an apparent fan or diverging plane of light, of the desired geometry.]

If the light source is essentially pinpoint in dimension, as in the case of the Xenon short arc lamp, a parabolic mirror may be used to direct much of the light into essentially parallel rays forming a substantially collimated beam which may then be turned 90° and spread out into a fan-shape by means of a reflecting surface, such as a conical section, without requiring any lenses in the system. In this example, which is the preferred embodiment, the light source is the optical object and the line of reflected light observed by the operator is the optical image.

If the light source is relatively large, as in the incandescent lamp, the light source may be too large to serve directly as the optical object because an insufficient number of the light rays may be reflected in parallel fashion by, say, a parabolic mirror. When the source of light is large it is therefore desirable to introduce an aperture and lenses into the system. One embodiment thereof is described above in respect of FIGS. 2–4, and an exemplary different optical system utilizing an incandescent lamp is described below in connection with FIG. 7 which utilizes a cropper or aperture which passes most of the rays of light and which has its edges illuminated. Those rays of light which pass through the aperture are then directed through optical lenses similar to those shown in FIG. 3, and the resulting beam of light is converted to the desired fan of light by a reflector, such as the cone 54 or a conic section.

It will now be apparent that *at* any elevation, including floor level, [that] my light optical reference system enables the operator to maneuver much more efficiently during both loading and unloading operations either in relation to bin openings, other loads or stationary objects, or in any of the multitude of operations in which lift trucks are utilized. It will be also appreciated that incorporating such a light optical reference system in relation to a number of types of lift truck attachments, such as pantograph fork reach type devices, side shift devices, and others, will enable an operator to more efficiently and productively utilize the attachments and with little or no damage to articles handled.

Figure 6:
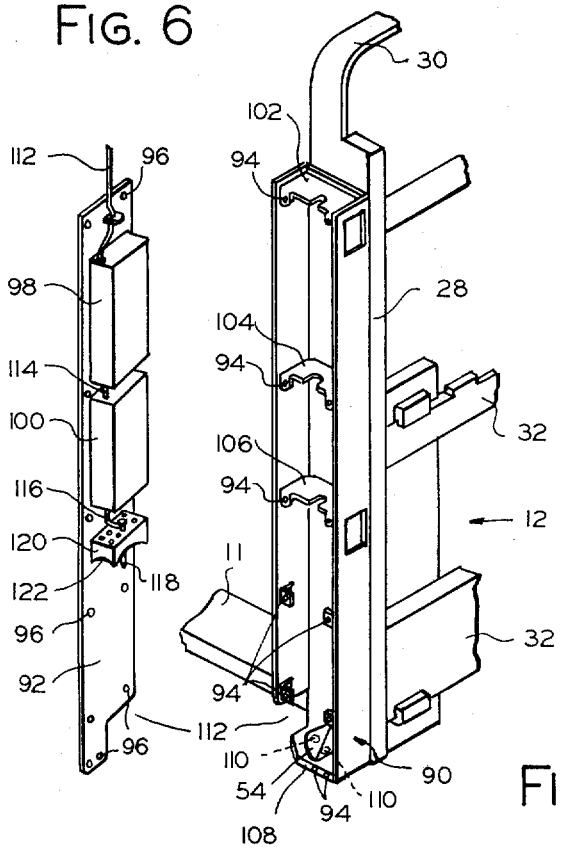
FIG. 6 is a perspective view of a part of a fork carriage showing a modified structure of the invention mounted in an end box-beam and having a component supporting beam cover plate shown detached from the portion of the hollow beam which is secured to the load carriage.

Referring now in detail to FIG. 6, a broken-away portion comprising the left-hand of the fork carriage 12 is illustrated in which a modification of my light reference system is contained within a box section case assembly 90 having a system component supporting cover plate 92 securable thereto and mounted from the outer surface of the carriage side member 28. Threaded pairs of mounting brackets 94 are provided to which cover plate 92 may be secured through alignable pairs of openings 96, a solid-state power supply source 98 and a high voltage power supply 100 being sandwiched between pairs of mounting plates 102, 104 and 104, 106, respectively, in case 90. A conic reflecting mirror 54 or a conical mirror section is secured to the bottom plate 108 through blind threaded openings 110 which extend into the base of the mirror, an aperture 112 being formed between the front and cover plates of case 90 when fully assembled. An input direct current power line 112 is connected to the truck battery, or an auxiliary battery, and connects to power supply 98 as shown which in turn is connected to the high voltage power supply 100 by line 114 which is connected by a line 116 to, preferably, a Xenon short arc lamp 118 which is secured by a mounting block 120 housing a parabolic mirror 122 and preferably including X, Y and Z axes screw adjustments, not shown, for locating the arc of the Xenon lamp at the exact focal point of the parabolic mirror for precise focusing. The system, as may be readily noted in FIG. 6, is packaged in a relatively thick walled metal box which is welded to each side of the fork carriage, characterized by rugged, shock-resistant, long-service life construction for warehousing operations, and the like in an industrial truck environment. The generated fan of light is, of course, projected through aperture 112, the size of which in a lateral direction limits the size of the angle of the fan of light projected. The arc light of the Xenon lamp is preferably very small, such as approximately 0.010 inch diameter. The high voltage power supply 100 is required for the high voltage starts required of Xenon lamps. For example, it may be necessary to charge a capacitor to about 20,000 volts before it fires to ionize the gas in a Xenon lamp which then drops to 12 volts at steady state. Suitable power supply and Xenon lamp components for such a system are manufactured by Pichel Industries, Inc., of Pasadena, Calif., and may operate on any one of a number of applied voltages such as 12, 24, 36, 48 or 72 volts.

Referring now to FIG. 7, the optical system is similar in certain respects to the embodiment in FIG. 3, and like components have been similarly numbered. It has been found that if the light source is relatively large, as pointed out before herein, it is necessary to introduce an aperture and lenses into the system. In FIG. 7 the parabolic mirror 39 projects the rays of light through, preferably, a round opening 130 in an aperture plate 132 and then through the lenses 40 and 42 to be reflected in a diverging plane or fan of light by a half-section conical reflecting surface 134 through opening 136, all within a mounting case 138 which may be constructed generally similarly to the outer case portion of case 90 in FIG. 6.

Aperture plate 132 has been found important in order to intensify the projected fan of light by interrupting the relatively weak peripheral ring of rays as projected by reflector 39 so that the relatively intense and substantially parallel rays which pass through aperture 130 will be focused upon first lens 40 which has a positive focal number to cause those rays to converge, and then lens 42 which has a negative focal number causes the converging rays to revert back to parallel, the net effect of the two lenses being to reduce the total cross section of the light passing through aperture 130, as shown in broken lines. This compound lens system should be positioned relative to the aperture 130 such that the aperture rather than the light source becomes the optical object, and the reflected line of light viewed by the operator is the optical image. Of course, embodiments such as shown in FIGS. 3 and 7 [ shown ] *show* functionally only the relationships of the various elements of the optical systems, and are not intended to show the actual design of lenses, focal distances, and the like, which will become readily discernible to persons skilled in the art.

In the FIG. 6 embodiment such elements of design are unimportant inasmuch as the short arc lamp itself produces a collimated beam of light and the distance between the conical reflector 54 and the lamp 118 is not important from an optical point of view.

Figure 8:
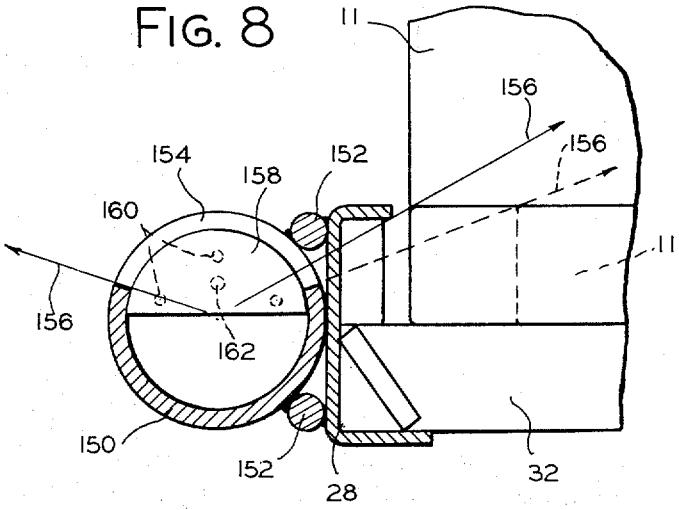
FIG. 8 is a partial sectional view of one end of the fork carriage showing yet another modification of the invention.
Figure 9:
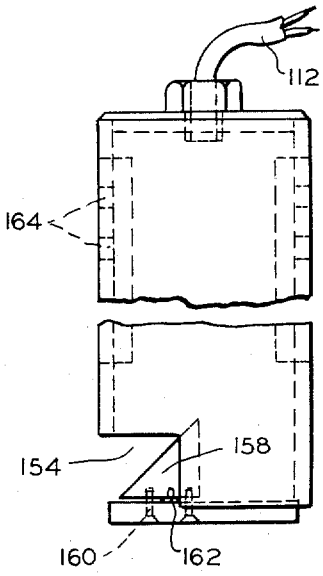
FIG. 9 is a broken-away side view of the portion of FIG. 8 which embodies my invention.

Referring now to the modification shown in FIGS. 8 and 9, I have represented a preferred structural embodiment of my invention in the use of a single tubular metal case member 150 mounted from the fork carriage side plate 28 as by a pair of rods 152 welded to the side member and to the tubular case, and having an aperture 154 in the forward bottom portion thereof through which a wide angle fan of light 156 may be projected as illustrated. A half-section conical reflecting mirror 158 is secured and carefully located on the bottom plate of the case 150 by means of screws 160 and may include a rubber fulcrum 162 to separate the bottom surface of the mirror from the metal surface of the bottom case plate. Circular support plates, not shown, may be secured suitably within the tube for mounting power supply elements 98 and 100 (FIG. 6), and a mounting block for the short arc lamp 118 and parabolic mirror 122, all as disclosed in FIG. 6. Openings 164 may be provided in the wall of case 150 as may be required for circulating air through the interior of the casing for cooling.

It should be noted that the reflecting mirror 158 is adjustable in any plane by the triangularly related screws 160 adjustable to pivot the mirror on the centrally located resilient fulcrum 162 within the space which separates the mirror from the bottom case plate. The fulcrum, as seen in FIG. 9, is generally in the shape of a rivet. Thus, the adjustment screws 160 as related to each other and to the fulcrum 162 provide an extremely simple, but effective, universal adjustment by which the mirror 158 may be tilted either forwardly or rearwardly, to one side or the other, and in any plane therebetween, in order to precisely align the reflected line of light with the plane of the fork in the exemplary embodiment.

As pointed out above, the angle of the fan of light is limited by the angle subtended by the aperture 154 or any lesser angle imposed by an interfering part, such as fork 11 in its outer solid line position represented by the right-hand solid edge of the fan of light 156. With the fork adjusted one notch inboard on the fork bar, the bar of light increases to its maximum angle as illustrated by the dotted line edge 156 tangent to the right-hand edge of the aperture 154.

Figure 10:
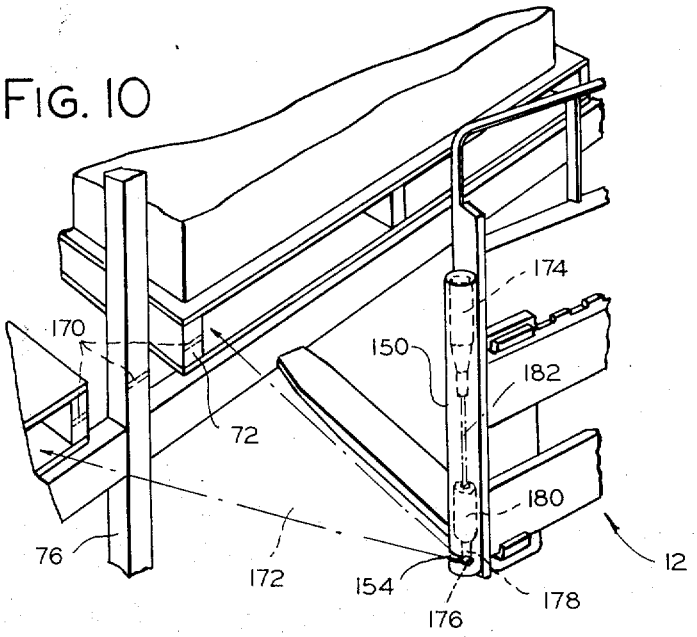
FIG. 10 is a broken-away and somewhat schematized view of an elevated fork carriage similar to the showing thereof in FIG. 2, but showing yet another embodiment of the invention.
Figure 11:
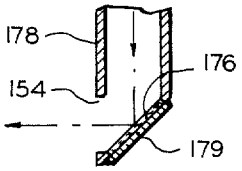
FIG. 11 is a broken-away sectional view of a part of FIG. 10.

Referring now to FIGS. 10 and 11, a substantially different embodiment is disclosed diagrammatically in which an apparent line of light of the character produced by the embodiment of FIG. 6, for example, is produced on the pallet stringer 72 and rack member 76 at 170 by an apparent fan of light 172 as produced by a gas laser 174, which may be mounted in a tubular casing 150 the same as in FIGS. 8 and 9, in turn mounted from the usual fork carriage 12 as represented in the various embodiments disclosed herein. The gas laser is preferably of the bottle type such as is manufactured by Hughes Aircraft Company, Electron Dynamics Division, Torrance, Calif. A 45° biased reflecting mirror 176 is mounted from a hollow open end motor shaft 178 upon a biased mounting plate 179 as by bonding, the plate 179 being secured as by welding to shaft 178 which is driven by a small hollow shaft electric motor 180 for rotating the mirror at a selected RPM. The motor 180 and laser bottle 174 are coaxially aligned so that the laser beam 182 is directed through the hollow shaft of motor 180 onto the reflecting surface of biased mirror 176 which, when the reflecting surface thereof is rotating within the angle subtended by the aperture opening 154 in case 150, projects the beam through the aperture at right angles to the direction thereof in case 150. If the mirror is rotated at a properly selected RPM the observable effect in respect of the apparent projection of a line of light 170 on the rack and pallets, or on any other surface towards which it is projected, will be essentially the same as in the other embodiments.

The use of a fan or apparent fan of sharply demarcated light collimated in one dimension and focused on infinity or at some predetermined distance and projected in a predetermined manner in relation to any vehicle or device on which the system is mounted and in relation to the object to be engaged or other referenced relationship provides the driver or operator significant advantages as discussed above. In thus improving the basis upon which a driver's judgment is exercised, this important improvement and the results flowing therefrom reflect considerably advantages to be gained in the uses of the invention as above related.

It will be recognized that the embodiments of my invention described in detail above are intended to be exemplary in character only, and this disclosure is intended for the purpose of illustration and not as a limitation of the scope of the invention. Numerous variations and modifications may be made to suit different requirements, and other changes, substitutions, additions and omissions may be made in the construction arrangement of the parts without necessarily departing from the scope of the invention. Accordingly, it is not my intention to be limited to any particular form of the invention herein illustrated and described except as may appear in the claims appended.

I claim:

1. In a vehicle *maneuverable by an operator* having a [ manipulatable ] load handling device *maneuverable both in elevation and in attitude*, a light optical means mounted on the handling device being so constructed and arranged as to [ provide a substantially collimated light beam and to ] project [ said ] light [ beam ] from said load handling device as a diverging plane of light collimated in one dimension and in a predetermined attitude in relation to the load handling device such that a visual reference of *both* the [ position ] *elevation and attitude* of the load handling device appears in the form of a distinctly perceivable line of light on surfaces in the path of the projected diverging plane of light *both parallel and angular to the direction of travel of the vehicle.*

2. A device as claimed in claim 1 wherein the light optical means is mounted on the load handling device inside of rigid enclosing structure in a manner which protects the light optical means from damage during relatively rough load handling operations.

3. A device as claimed in claim 1 wherein said light optical means is adapted to project light through a plane having diverging edges.

4. A device as claimed in claim 2 wherein said load handling device comprises an elevatable carriage of a lift truck, and *at least a portion of* said enclosing structure comprises an elongated hollow beam means secured lengthwise of one side of the carriage and having an opening through which the [ collimated ] light [ beam ] is projected as said diverging plane of light.

5. A device as claimed in claim 2 wherein said [ collimated ] light [ beam ] travels longitudinally of said enclosing structure *as a collimated beam*, and means is provided for redirecting and projecting said *collimated* light beam as said diverging plane of light through an opening formed in said rigid enclosing structure.

6. A device as claimed in claim 5 wherein the source of said light beam is located in the enclosing structure in longitudinally spaced relation to the opening through which is projected said plane of light.

7. A device as claimed in claim 4 wherein said carriage is a fork carriage, said enclosing structure is secured at one side only of the fork carriage, and said opening is dimensioned such that the diverging edges of said plane of light are adapted to subtend an angle so that the line of light as projected on a surface adjacent the lift truck indicates the elevation and attitude of the fork carriage at both sides thereof.

8. A device as claimed in claim 4 wherein the location of said line of light is an operative visual reference of both the elevation and tilt attitude of said carriage.

[ 9. A device as claimed in claim 1 wherein said light beam is projected in a diverging plane transverse to the direction of movement of the load handling device on the vehicle so that the elevation and attitude of the handling device may be visually perceived as a line of light on surfaces both parallel and angular to said direction of travel.]

10. A device as claimed in claim 1 wherein said diverging plane of light is projected both sideways and forwardly of the load handling device.

11. A device as claimed in claim 1 wherein said projected plane of light is substantially of a fan-shape.

12. A device as claimed in claim 1 wherein *said light optical means provides a substantially collimated light beam and* a conical reflector converts said collimated light beam to said diverging plane of light.

13. A device as claimed in claim [9] *1* wherein [the vehicle is a maneuvering vehicle the load handling device of which is maneuverable in elevation as well as with the vehicle, ] said line of light [ being ] *is* a continuous visual reference on the said surfaces facilitating precise operator's control of the load handling device during maneuvering of the vehicle, whereby to reduce the requirement for operator's depth perception other than by said visual reference.

14. An apparatus as claimed in claim 1 wherein [ the load handling device is maneuverable both with the vehicle and in elevation, the projected line of light being projected in a plane substantially transverse of the direction of movement of the load handling device so that the elevation and attitude thereof may be visually perceived as a line of light on surfaces both parallel and angular to the load handling device, ] tilting of the load handling device from a horizontal position [ causing ] *causes* the line of light to be projected onto a substantially vertical surface which is substantially parallel to the direction of travel of the load handling device at an angle to the horizontal which indicates to the operator the approximate angle and direction of tilt of the load handling device, and turning of the load handling device from such a parallel to a transverse relation to said vertical surface [ causing ] *causes* the line of light to reflect as a substantially horizontal line from the transverse surface which indicates both the attitude and elevation of the load handling device in relation thereto.

15. [ An apparatus for mounting on a maneuverable ] *In a* load handling device *mounted on a maneuverable vehicle and elevatable thereon, an apparatus* comprising a rigid housing, means mounted in the housing for producing a substantially collimated light beam which is projected inside of the housing, an opening in said housing, reflector means in said housing mounted in a predetermined relation both to said light beam means and to said opening, said reflector means being in the line of projection of said light beam and being adapted to project said light beam through said opening and outside of said housing, said opening being of such predetermined size and location relative to said reflector means as to permit said light beam to be projected outside of said housing in a predetermined attitude in relation to said load handling device and in a manner to produce a visual reference which appears in the form of a distinctly perceivable elongated line of light on [ a surface ] *surfaces* in the path of the projected light beam, [ said line of light defining the position of the load handling device relative to said surface ] *the projected line of light being projected in a plane substantially transverse to the direction of movement of the load handling device so that the elevation and attitude thereof may be visually perceived as said line of light on surfaces both parallel and angular to the load handling device.*

[ 16. An apparatus as claimed in claim 15 wherein the load handling device is mounted on a vehicle and is maneuverable both with the vehicle and in elevation, the projected line of light being projected in a plane substantially transverse to the direction of movement of the load handling device so that the elevation and attitude thereof may be visually perceived as a line of light on surfaces both parallel and angular to the load handling device.]

17. [ An apparatus ] *A device* as claimed in claim [ 16 ] *32* wherein tilting of the load [ holding ] *handling* device from a horizontal [ portion ] *position* causes [ a ] *said* line of light to be projected onto a vertical surface parallel to the direction of travel of the vehicle at an angle to the horizontal which indicates to the operator the angle and direction of tilt of the load handling device.

18. [ Apparatus ] *A device* as claimed in claim 17 wherein turning the load handling device from a parallel to a transverse relation to said vertical surface causes the line of light to reflect as a substantially horizontal line from the transverse surface which indicates both the attitude and elevation of the load handling device in relation thereto.

19. An apparatus as claimed in claim 15 wherein said reflector means is supported on a fulcrum and is adapted to be mounted on triangularly related adjustment means for tilting the reflector means on the fulcrum.

20. An apparatus as claimed in claim 15 wherein said reflector means is supported on a fulcrum and is adapted to be mounted on adjustment means for tilting the reflector means on the fulcrum in any one of a plurality of selected directions to adjust the position of the line of light on said [ surface ] *surfaces.*

21. Apparatus as claimed in claim 15 wherein said light beam means includes a light source located at the focal point of a reflector for producing said light beam, said reflector means projecting said light beam as a diverging plane of light which appears as said line of light on such [ a surface ] *surfaces.*

22. Apparatus as claimed in claim 15 wherein said light beam means provides a laser beam, and said reflector means projects said laser beam as a scanning beam forming a diverging plane of light such that it is visually perceived as said line of light on [ such a surface ] *such surfaces.*

23. Apparatus as claimed in claim 15 wherein said light beam means includes a light source, reflector, lens means and cropper means intermediate said light source and lens means for interrupting an area of peripheral light rays emanating from the light source toward said lens means all of predetermined design and spacing to [ produce ] *focus* said substantially collimated light beam, said reflector means projecting said collimated beam through said opening as a diverging plane of light.

24. Apparatus as claimed in claim 15 wherein said reflector means receives said beam of light and projects it through said opening in a diverging plane collimated in one dimension and adapted to reflect from said [ surface ] *surfaces* as said line of light.

25. Apparatus as claimed in claim 15 wherein said rigid housing is of tubular or multi-sided elongated construction said light beam being directed lengthwise thereof and said reflector means being spaced longitudinally [ thereof ] *of the source of said light beam* for receiving said light beam in the vicinity of said opening and for redirecting and reforming said light beam to project through said opening so as to form said visually perceivable line of light.

26. Apparatus as claimed in claim 25 wherein said light beam is a laser beam and said reflector means projects said laser beam as a scanning beam in a diverging plane.

27. [ Apparatus ] *A device* as claimed in claim [ 25 ] *32* wherein said light [ beam ] is projected as a flat diverging plane of light [ which is reflected as said line of light from said surface ].

28. Apparatus as claimed in claim 22 wherein said reflector means includes a biased motor driven reflecting surface for projecting said laser beam as a scanning beam.

29. [ Apparatus ] *A device* as claimed in claim [ 15 ] *32* wherein [ said ] *such a parallel* surface reflects a sloping line of light if the load handling device is in a non-horizontal attitude, the slope of the line of light increasing in proportion to the angle of said device from horizontal.

30. [Apparatus] *A device* as claimed in claim [15] *32* wherein said load handling device is a tiltable and elevatable fork carriage of a lift truck, and said line of light as reflected and perceived by an operator provides a direct visual reference to the angle of tilt of the fork either rearwardly or forwardly and to the elevation of the fork.

31. Apparatus as claimed in claim 21 wherein said light source comprises a high intensity arc lamp.

*32. In a vehicle maneuverable by an operator having a load handling device maneuverable both in elevation and in attitude, a light optical means mounted on the handling device being so constructed and arranged as to project light from said handling device so that it traverses and is projected in a diverging plane substantially transverse to the direction of movement of the load handling device with the vehicle, the light being collimated in at least one dimension and in a predetermined attitude in relation to the handling device providing for the operator a visual reference of both the elevation and attitude of the handling device in the form of a distinctly perceivable line of light on surfaces in the path of said diverging plane both parallel and angular to the direction of travel of the vehicle.*

*33. An apparatus as claimed in claim 32 wherein said light optical system includes an incandescent light as a source of light.*

*34. An apparatus as claimed in claim 33 wherein said light optical system includes means interrupting an area of peripheral light rays emanating from the incandescent light for focusing the light.*

*35. An apparatus as claimed in claim 34 wherein said interrupting means is a cropper means.*

*36. An apparatus as claimed in claim 34 where said light optical system includes a lens, said interrupting means being located intermediate the incandescent light and the lens.*

*37. An apparatus as claimed in claim 1 wherein said light optical system includes an incandescent light as a source of light and means interrupting an area of peripheral light rays emanating from the incandescent light for focusing the light.*

*38. An apparatus as claimed in claim 14 wherein said light optical system includes an incandescent light as a source of light.*

*39. An apparatus as claimed in claim 38 wherein said light optical system includes means interrupting an area of peripheral light rays emanating from the incandescent light for focusing the light.*

*40. An apparatus as claimed in claim 39 wherein said light optical system includes a lens, said interrupting means being located intermediate the incandescent light and the lens.*

* * * * *